United States Patent [19]

Povejsil

[11] E Re. 31,058

[45] Reissued Oct. 19, 1982

[54] SEAL AND SEAL ASSEMBLY

[75] Inventor: James H. Povejsil, Mentor, Ohio

[73] Assignee: Towmotor Corporation, Mentor, Ohio

[21] Appl. No.: 179,121

[22] Filed: Aug. 18, 1980

Related U.S. Patent Documents

Reissue of:

[64] Patent No.: 4,210,339
Issued: Jul. 1, 1980
Appl. No.: 4,791
Filed: Dec. 26, 1978

[51] Int. Cl.[3] ..... F16J 15/32

[52] U.S. Cl. ..... 277/153; 277/95; 305/11; 308/187.1

[58] Field of Search ..... 277/92, 95, 152, 153, 277/165, 205, 206 R; 308/36.1, 187.1, 187.2; 305/11, 12

[56] References Cited

U.S. PATENT DOCUMENTS

| | | | |
|---|---|---|---|
| 2,966,376 | 12/1960 | Reynolds | 277/153 X |
| 3,006,701 | 10/1961 | Curtis | 308/187.1 |
| 3,306,683 | 2/1967 | Deuring | 308/187.2 |
| 3,447,848 | 6/1969 | Pitner | 308/187.2 |
| 3,542,392 | 11/1970 | Cumming | 280/96.1 |
| 3,639,016 | 2/1972 | Bourgeois | 308/187.2 |
| 3,658,395 | 4/1972 | Hallerback | 308/187.2 |
| 3,687,464 | 8/1972 | Jackson et al. | 277/153 |
| 3,717,394 | 2/1973 | Pitner | 308/187.1 |
| 3,787,098 | 1/1974 | Orr | 308/36.1 X |
| 3,841,723 | 10/1974 | Kelso | 308/187.1 |
| 3,858,950 | 1/1975 | Otto | 308/187.1 |
| 4,043,620 | 8/1977 | Otto | 308/187.2 |
| 4,106,781 | 8/1978 | Benjamin et al. | 277/82 |
| 4,134,596 | 1/1979 | Kawai et al. | 277/165 X |
| 4,141,562 | 2/1979 | Wu | 277/152 X |

FOREIGN PATENT DOCUMENTS

| | | | |
|---|---|---|---|
| 2708137 | 6/1978 | Fed. Rep. of Germany . | |
| 1139430 | 2/1957 | France | 308/187.1 |
| 1531683 | 5/1968 | France . | |
| 1025884 | 4/1966 | United Kingdom | 277/153 |
| 1296020 | 11/1972 | United Kingdom | 277/153 |

*Primary Examiner*—Robert S. Ward, Jr.
*Attorney, Agent, or Firm*—William B. Heming

[57] ABSTRACT

A seal (16) has a body (38), a leg (40) and first and second sealing areas (42,44). The seal (16) is used in a seal assembly (10) having first and second members (12,14), such as, for example, a frame portion (20) and steering knuckle (27) of a work vehicle. Apparatus (28) such as bearing (30) supports the knuckle (27) in rotation relative to a king pin (24) of the frame portion (20). Foreign matter can enter between the frame portion (20) and steering knuckle (27) and interfere with vehicle steering. In the assembly (10), the sealing surfaces (42,44) contact substantially perpendicular surfaces (32,34) of the frame portion (20) to block passage of foreign matter to the bearing (30). A second end portion (54) of the seal leg (40) can be controllably deflectable in order to permit overfill of lubricant to pass from the bearing cavity between the frame portion (20) and steering knuckle (27).

31 Claims, 4 Drawing Figures

SEAL AND SEAL ASSEMBLY

Matter enclosed in heavy brackets [ ] appears in the original patent but forms no part of this reissue specification; matter printed in italics indicates the additions made by reissue.

DESCRIPTION

1. Technical Field

The invention relates to a seal and seal assembly. More particularly, the invention relates to a leg of a seal which is controllably deflectable and has first and second sealing areas in slidable contact with substantially perpendicular surfaces in the seal assembly.

2. Background Art

In the use of a seal and seal assembly, it is desirable to block passage of foreign matter in one direction but to permit deflection of the seal in another direction to, for example, allow overfilling a bearing with lubricant to clean the bearing.

U.S. Pat. No. 4,043,620 which issued to Otto on Aug. 23, 1977, discloses configurations of bearing seals used to seal openings between a housing and a rotatable shaft.

U.S. Pat. No. 3,687,464 which issued to Jackson et al on Aug. 29, 1972, discloses a seal which has a U-shaped cross-section and is used to seal against a shaft and a housing perpendicularly oriented to the shaft. U.S. Pat. No. 3,841,723 which issued on Oct. 15, 1974, to Kelso shows a seal having a dust lip and a spring biased seal lip.

For example, a steering assembly for a work vehicle commonly includes an axle or frame mounted king pin about which a steering knuckle is rotatable. Rotation of the steering knuckle provides corresponding rotation of a spindle to controllably turn a wheel of the vehicle attached thereto. The steering knuckle is supported about the king pin by a bearing which must be protected and periodically lubricated to assure proper performance of the steering assembly.

The bearing is exposed to the environment of the work vehicle through an opening located between the steering knuckle and axle owing to the relative rotation of the two components. Heretofore, a seal having two lips or legs and being connected to the steering knuckle has been used. The two lips contact or seal against a surface on the frame or axle to block passage of foreign matter to the bearing. However, when lubricant is subsequently injected into the bearing said seal also blocks passage of the lubricant out of the bearing. In situations where the bearing is overfilled, such as to drive old lubricant from the bearing, this can cause damage to the seal or improper performance of the steering assembly. The result is a waste of time and labor owing to the reduced performance of the steering assembly or downtime in replacing the seal.

Therefore, it is desirable to provide a seal which blocks passage of foreign matter in one direction, such as to the bearing, and controllably deflects in another direction to permit lubricant overfill of the bearing to relieve for substantially preventing damage to the seal as a result of the overfill.

DISCLOSURE OF INVENTION

In one aspect of the present invention, a seal has a body and a leg connected at a first end portion to the body. The leg has first, second and third sides and a second end portion of a construction sufficient for being controllably deflectable in response to a force exerted on at least one of the first and third sides. The seal has first and second sealing areas positioned on the leg adjacent the intersection of the first and third sides and second and third sides, respectively.

In another aspect of the present invention, a seal assembly has first and second members. The first member has first and second surfaces oriented substantially perpendicular one relative to the other. The second member is positioned adjacent said first member. A seal body is connected to the second member. A seal leg is connected to the body and extends outwardly from said body. First and second sealing areas are positioned on said leg. The first sealing area is in slidable contact with the first surface of the first member. The second sealing area in slidable contact with the second surface of the second member.

The first and second members of the seal assembly are, for example, a frame portion and a steering knuckle, respectively. The steering knuckle is supported relative to the frame portion by a bearing. In operation of an associated work vehicle, foreign matter can pass between the frame portion and steering knuckle and interfere with the bearing. The seal blocks passage of the foreign matter and is also controllably deflectable to permit passage of lubricant overfill from the bearing for cleaning said bearing.

BEST MODE FOR CARRYING OUT THE INVENTION

Figure 1:
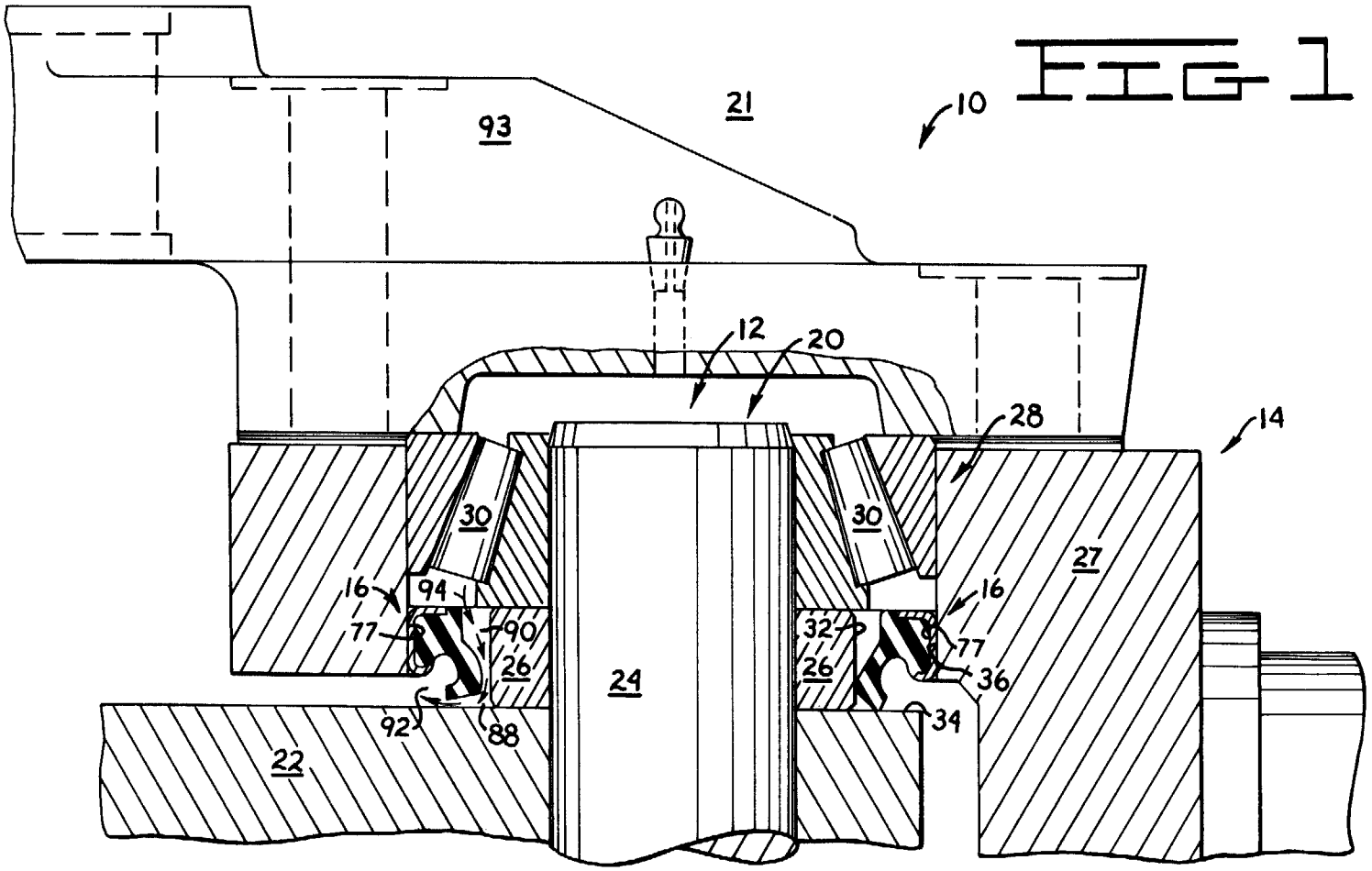
FIG. 1 is a diagrammatic view showing one embodiment of the seal assembly of the present invention associated with a steering mechanism.

Referring to FIG. 1, a seal assembly 10 includes first and second members 12,14 rotatable one relative to the other and a seal 16. The first member 12 is, for example, a frame portion 20 of a work vehicle 21. Said frame portion 20 includes an axle 22, king pin 24 and a spacer 26. The second member 14 is, for example, a steering knuckle 27 of the work vehicle which is positioned adjacent said frame portion 20. The steering knuckle 27 is rotatable about the fixed frame portion 20 in response to input forces exerted in steering the work vehicle 21. Means 28, shown as a bearing 30, is provided for supporting said frame portion 20 and the steering knuckle 27 in rotation one relative to the other. Such wheel steering construction is well known in the vehicle art.

The frame portion 20 has first and second surfaces 32,34 oriented substantially perpendicular one relative to the other and defined by the spacer 26 and axle 22, respectively. The frame portion 20 and steering knuckle 27 define an annular opening 36 between said steering knuckle 27 and said first and second surfaces 32,34. The seal 16 in the seal assembly 10 is annular in configuration and is positioned at a location sufficient for controllably sealing the passage of material through said annular opening 36 as will be hereinafter described.

Figure 3:
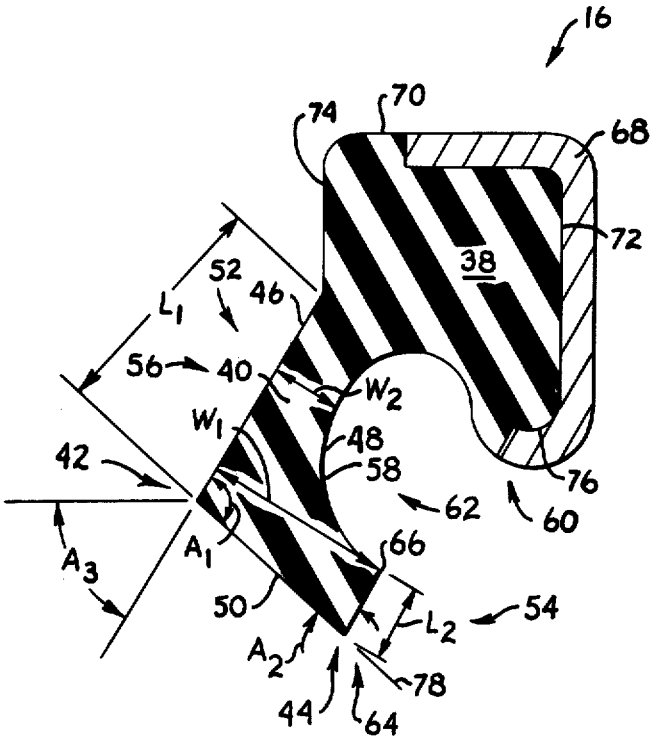
FIG. 3 is a diagrammatic cross-sectional view showing one embodiment of the seal of the present invention.

Referring particularly to FIG. 3, the seal 16 includes a body 38, a leg 40 and first and second sealing areas 42,44. The leg 40 has first, second and third sides 46,48,50, first and second end portions 52,54 and a middle portion 56. Said leg 40 is connected at the first end portion 52 to the body 38 and extends outwardly from said body 38. The first and [second sides 46,48 are substantially] *third sides 46,50 are* linear[, and generally opposed one to the other] *straight along their full lengths*. The third side 50 intersects the first and second sides 46,48 at the second end portion 54 preferably at respective angles $A_1$,$A_2$ of about 90°. Said seal 16 preferably has only a single leg 40 as shown.

The first and second sealing areas 42,44 are each positioned on the leg 40 adjacent the intersection of the first and third sides 46,50 and the intersection of the second and third sides 48,50, respectively. Said sealing areas 42,44 are preferably located at or formed by the intersection of the first and third sides 46,50 and the second and third sides 48,50 respectively.

The second end portion 54 of the leg 40 is of a construction sufficient for being controllably deflectable relative to the first end portion 52 in response to a force exerted on at least one of the first and third sides 46,50 of the leg 40. In the embodiment shown, the second side 48 of the leg 40, which is generally opposed to the first side 46, is of a configuration sufficient for defining a reduced cross-sectional area of said leg 40 at the middle portion 56 relative to said second end portion 54. The reduction in cross-sectional area, as further defined below by the configuration of said second side 48, provides controllable deflection of the second end portion 54 for the purposes hereinafter discussed.

The second side 48 of the leg 40 has an arcuate surface 58 extending curvilinearly inwardly on said leg 40 from the second end portion 54 toward the middle portion 56 in a direction generally toward the first side 46. The leg 40 has a width at $W_1$ defined by the distance between the first and second sides 46,48 and the arcuate surface 58 extends inwardly at the middle portion 56 about one-half of said width (shown at $W_2$). In other words, the second side 48 extends curvilinearly inwardly and progressively reduces the cross-sectional area of the second leg 40 from the second end portion 54 toward the middle portion 56. Thus, the cross-sectional area adjacent $W_2$ is less than the cross-sectional area adjacent $W_1$. It is also desirable that said arcuate surface 58 further extend curvilinearly outwardly from the middle portion 56 toward the first end portion 52 of the leg 40 in a direction from the first side 46 and intersect the body 38 at a location 60 at which the leg 40 connects at the second side 48 to the body 38.

The second side 48 has an arcuate portion 62 defining the arcuate surface 58 of said second side 48 and a substantially linear *and straight* portion 64 intersecting the third side 50 of the leg 40 and which is preferably substantially parallel to the first side 46 of said leg 40. Said linear portion 64 has a length [($L_1$)] $L_2$ about one-third the length [$L_2$] $L_1$ of the first side 46 in order to maintain sufficient width at the second end portion 54 of the leg 40 for adequate rigidity of the seal 16 in position in the seal assembly 10 against the first and second surfaces 32,34 of the frame portion 20. Further, the [first] *second* sealing area [42] *44* is positioned on the leg 40 at a location immediately adjacent a point 66 on the second side 48 from which the arcuate surface 58 extends inwardly toward the first side 46.

Figure 4:
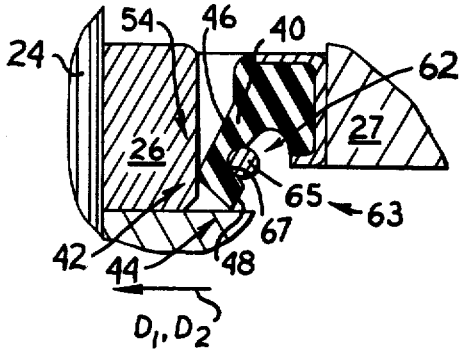
FIG. 4 is a diagrammatic view showing another embodiment of the seal and seal assembly of the present invention associated with a steering mechanism.

Referring to the embodiment of FIG. 4, means 63 is provided for biasing the second end portion 54 of the leg 40 relative to the first end portion 52 of said leg 40 in a direction $D_1$ from the second side 48 toward the first side 46 of the leg 40. Said biasing means 63 is shown as a spring 65, such as a helical spring, positioned on the second side 48 of the leg 40 and retained in a groove 67 formed in the arcuate portion 62 of said second side 48. In an annular configuration of the seal 16, which is the preferred embodiment, the spring 65 tends to bias [outwardly] against and about said second side 48 to urge said first and second sealing areas 42,44 into contact with the first and second surfaces 32,34 when the seal 16 is positioned in the seal assembly 10. Said biasing means 63 can also be, for example, a ring or similar element which tends to expand [outwardly] against the second side 48.

The body 38, leg 40 and first and second sealing areas 42,44 are preferably of unitary, elastomeric construction. The seal 16 also has a carrier element 68 connected or molded to the body 38 on at least first and second sides 70,72 of said body [40] *38*. The carrier element 68 is of metallic construction as is known in the art. The first and second sides 46,[50]*48* of the leg 40 intersect third and fourth sides 74,76 of the body 38 and define the orientation of the leg 40 relative to the body 38 as shown. It should be understood that the seal 16 can be of other configurations as is known in the art without departing from the invention.

In the installed position of the seal 16 in the seal assembly 10, the seal body 38 is connected to the steering knuckle 27 and positioned adjacent and extending about the annular opening 36. In the embodiment shown, said seal 16 is press fit into a substantially circular bore 77 defined by the steering knuckle 27 owing to the oversize configuration of the metallic carrier element 68. The first sealing area 42 is positioned in sealing, slidable contact with the first surface 32 of the frame portion 20. The second sealing surface 44 is positioned in sealing slidable contact with the second surface 34 of the frame portion 20. It is desirable that the second end portion 54 of the leg 40 be controllably deflectable as above described with respect to the individual seal 16. The first and second sealing areas 42,44 are thus removable from contact with the first and second surfaces 32,34, respectively, in response to controllably deflecting the second end portion 54.

A line 78 passing between the first and second sealing areas 42,44 intersects the first surface 32 of the frame portion 20 at an angle $A_5$ in a range of about 45° to about 90°. The third side 50 extends between said sealing areas 42,44 and defines said line 78. The angle $A_5$ in the preferred embodiment is about 45°. In other words, said line 78 passing between the sealing areas 42,44 defines a chord 80 of a circle 82 having a radial line 84. The radial line 84 substantially bisects the chord 80 and passes immediately adjacent the intersection 86 of first and second planes 32', 34' defined by the first and second surfaces 32,34 of the frame portion 20. As is also shown, the first side [42] *46* of the leg 40 intersects the first surface 32 of the frame portion 20 at an angle $A_6$ [of about 60°]. The linear portion 64 of the second side [44] *48* intersects the second surface 34 of the frame portion 20 at an angle $A_7$ of about 60°.

Figure 2:
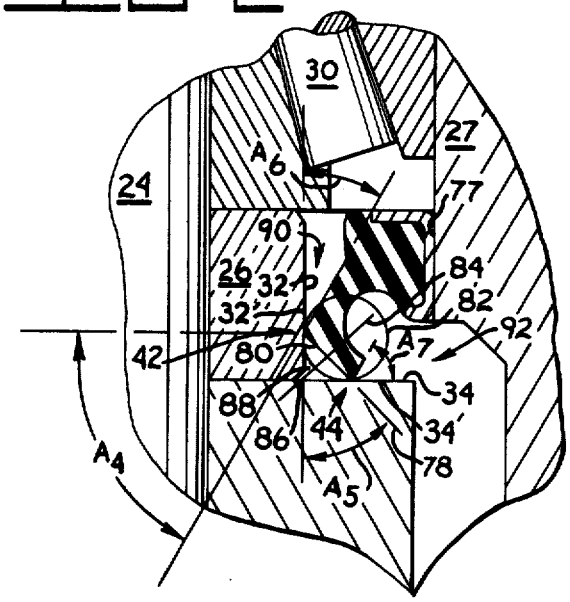
FIG. 2 is a diagrammatic partial view of FIG. 1 showing the invention in greater detail.

It is desirable that the first and second sealing areas 42,44 urge against the first and second surfaces 32,34 of the frame portion 20, respectively, in order to maintain a positive "seal" against said surfaces 32,34. The biasing means [65] *63* or spring [67] *65* in the embodiment of FIG. 4 biases the second end portion 54 of the leg 40 relative to the first end portion 52 of the leg 40 in a direction $D_2$ toward the first surface 32 of the frame portion 20 to assure the positive "seal". Said direction $D_2$ is shown substantially the same as the direction $D_1$. The positive "seal" can also be assured by preloading the leg 40. In other words, the orientation of the first side 46 of the leg 40, as represented by angle $A_3$, (FIG. 3) can be provided in the seal 16 such that said first side 46 is displaced from said angle $A_3$ to an installation angle $A_4$ (FIG. 2) when the seal 16 is in the installed position. Thus, angle $A_3$ is provided less than angle $A_4$ to establish the preloaded condition.

On the [sealed] *seal* assembly 10, the leg 40 forms an annular chamber 88 with the frame portion 20. The annular chamber 88 is defined by the first and second surfaces 32,34 of said frame portion 20 and the third side 50 of the leg 40. The leg 40 also forms first and second channels 90,92 with said frame portion 20. Said first and second channels 90,92 are defined by the first side [42] *46* of the leg 40 and the first surface of the frame portion 20 and the second side [44] *48* of the leg 40 and the second surface 34 of the frame portion 20, respectively. Said channels 90,92 are of a construction sufficient for being positionable in communication one with the other in response to removing the first and second sealing areas 42,44 from contact with the first and second surfaces 32,34 respectively.

It is desirable that in the seal assembly 10 the second end portion 54 of the leg 40 be controllably deflectable relative to the first end portion 52 of the leg 40, as was explained previously with respect to the seal 16. Also, the configuration of said seal 16 is preferably also as above explained with respect to the seal 16. The first and second sealing areas 42,44 are removable from contact with the first and second surfaces 32,34 of the frame portion 20, respectively, in response to controllably deflecting said second end portion 54, as is shown by way of example in FIG. 1. The channels 90,92 are in fluid communication one with the other in response to exerting a force on at least one of the first and third sides 46,50 of the leg 40 for deflecting said second end portion 54.

It should be understood that the seal 16 and seal assembly 10 can be of other configurations as is known in the art without departing from the invention.

INDUSTRIAL APPLICABILITY

In the use of the seal 16 in the seal assembly 10, the first and second sealing areas 42,44 slidably contact the first and second surfaces 32,34 of the frame portion 20 to block passage of foreign matter through the annular opening 36 and to the bearing 30. Overfill of lubricant in the bearing 30 controllably deflects the second end portion 54 of the leg 40 to relieve lubricant through the annular opening 36 to clean the bearing 30.

For example, input forces on the steering knuckle 27 through a steering arm 93 cause said knuckle 27 to rotate relative to the frame portion 20. In rotation the first and second sealing surfaces 42,44 wipe or slide along the frame portion 20 to prevent passage of dirt, water of the like through the annular opening 36 to the bearing 30. Thus, the bearing 30 is substantially protected from the effects of the environment of the work vehicle 21. Said sealing surfaces 42,44 remain seated on the surfaces 32,34 of the frame portion 20 and the second end portion 54 of the leg 40 resists deflection from forces exerted on the seal 16 by dirt or the like owing to the substantially linear configuration of the first side 46 of the leg 40 and its orientation relative to the frame portion 20.

After a period of use of the steering of the vehicle, it may be desirable to relubricate said bearing 30. The bearing 30 is commonly overfilled to permit flushing of the old lubricant from the bearing 30. As the lubricant passes through the bearing 30, it will urge initially against the first side 46 of the leg 40 and exert a force on said first side 46. Where the force is sufficient, the second end portion 54 of the leg 40 will deflect about the point of intersection of the first side 46 of the leg 40 and the body 38 owing to the curvilinear configuration of the second side 48 of the leg 40 and the corresponding reduction in cross-sectional area. Deflection of the second end portion 54 removes the sealing surfaces 42,44 from contact with the frame portion 20. The lubricant then flows from the first channel 90 through the annular chamber 88 and out the second channel 92. This action is represented by flow lines 94 in FIG. 1.

Force is also exerted on the third side 50 of the leg 40 during overfill. This tends to promote relief or escape of the lubricant from the bearing 30. Where the first and second sealing surfaces 32,34 urge against the frame portion 20, the relief of said lubricant tends to slow owing to the greater force required to overcome, for example, the spring 65 or preload of the leg 40. Following overfill some lubricant will be trapped in the annular chamber 88 and will act as an additional barrier to foreign matter. It should be understood that a force exerted on only the third side 50 of the leg 40 will also deflect the seal 16.

The first and second sealing areas 42,44 preferably are represented by points of contact such as are formed by the intersections of the first and third sides 46,50 and second and third sides 48,50 of the [legs] *leg* 40, respectively, to reduce friction between the seal 16 and frame portion 20. The first sealing area 42 will, however, tend to wear a groove into the first surface 32 during operation of the vehicle steering. The wearing action on the first sealing area 42 results in movement of the second sealing [surface 34] *area 44* toward the first surface 32, but does not interfere substantially with the performance of the seal 16.

The preferred orientation and configuration of the seal 16 is shown in the drawings. The third side 50 intersects the first surface 32 at the angle $A_5$ which is about 45°. The [first side 46 and] linear portion 64 of the second side 48 [intersect] *intersects* the [first and] second [surfaces 32,34, respectively, at angles $A_6$,] *surface 34 at an angle* $A_7$ of about 60°. It will be evident from a study of the drawings that other orientations or configurations of the seal 16 will to some degree lessen or increase the effect of the deflection and sealing capabilities of the seal 16. For example, a greater angle $A_5$ tends to reduce the capabilities of seal 16 to relieve the lubricant flowing through the bearing 30 owing to a reduction in the size of the relief pathway available to said lubricant.

Other aspects, objects and advantages will become apparent from a study of the specification, drawings and appended claims.

I claim:

1. A seal (16), comprising:

a body (38);

a leg (40) having first, second and third sides (46,48,50), a middle portion (56) and first and second end portions (52,54) and being connected at the first end portion (52) to the body (38), said first side (46) being linear *and straight along its full length* and generally opposed to said second side (48), said second side (48) having a linear *and straight* portion (64) intersecting the third side (50) and being *oriented to extend* parallel to the first side (46) and an arcuate portion (62) defining an arcuate surface (58) extending curvilinearly inwardly in a direction generally toward the first side (46) and defining a reduced cross-sectional area of said leg (40) at the middle portion (56) relative to the second end portion (54), said third side (50) being [linear] *straight along its full length* and intersecting said first and second sides (46,48) at the second end portion (54), said second end portion (54) being of a construction sufficient for being controllably deflectable relative to said first end portion (52) in response to a force exerted on at least one of the first and third sides (46,50); and first and second sealing areas (42,44) positioned on said leg (40) adjacent the intersection of the first and third sides (46,50), and the intersection of the second and third sides (48,50), respectively.

2. The seal (16), as set forth in claim 1, wherein said first and second sealing areas (42,44) are located at the intersection of the first and third sides (46,50) and second and third sides (48,50), respectively.

3. The seal (16), as set forth in claim 1, wherein said seal (16) has only a single leg (40).

4. The seal (16), as set forth in claim 1, wherein said third side (50) intersects the first side (46) at an angle ($A_1$) of about 90°.

5. The seal (16), as set forth in claim 1, wherein said third side (50) intersects the second side (48) at an angle [(50)] ($A_2$) of about 90°.

[6. The seal (16), as set forth in claim 1, wherein said third side (50) is substantially linear.]

[7. The seal (16), as set forth in claim 1, wherein said first side (56) is substantially linear.]

[8. The seal (16), as set forth in claim 1, wherein said first side (46) of the leg (40) is substantially parallel to said linear portion (64) of the second side (48).]

9. The seal (16), as set forth in claim 1, wherein said [first] *second* sealing area [(42)] (*44*) is on said leg (40) at a location immediately adjacent a point (66) on said second side (48) from which said arcuate surface (58) extends inwardly toward said first side (46).

10. The seal (16), as set forth in claim 1, wherein said leg (40) has a width ($W_1$) defined by the distance between the first and second sides (46,48) and the arcuate surface (58) of said second side (48) extends inwardly about one-half of said width ($W_1$).

11. The seal (16), as set forth in claim 1, wherein said arcuate surface (58) extends outwardly from the middle portion (56) toward the first end portion (52) in a direction from the first side (46) and intersects the body (38) of the seal (16) at a location (60) at which said leg (40) connects at the second side (48) to said body (38).

12. The seal (16), as set forth in claim 1, wherein the length [($L_1$)] ($L_2$) of the linear portion (64) of the second side (48) is about one-third the length [($L_2$)] ($L_1$) of the first side (46).

13. The seal (16), as set forth in claim 1, wherein said seal (16) has a carrier element (68) connected to the body (38).

14. The seal (16), as set forth in claim 1, wherein said body (38), leg (40) and first and second sealing areas (42,44) are of unitary, elastomeric construction.

15. The seal (16), as set forth in claim 1, wherein said seal (16) is of an annular configuration.

16. The seal (16), as set forth in claim 1, including means (63) for biasing said second end portion (54) of the leg (40) relative to said first end portion (52) of the leg (40) in a direction ($D_1$) from the second [(34)] (*48*) toward the first side [(32)] (*46*) of the leg (40).

17. The seal (16), as set forth in claim 16, wherein said biasing means (63) is a spring (65) positioned on the second side [(34)] (*48*) of the leg (40).

18. A seal assembly (10) for blocking passage of foreign matter through an annular opening (36), comprising:

a first member (12) having first and second surfaces (32,34) oriented substantially perpendicular one relative to the other;

a second member (14) positioned adjacent said first member (12), said first and second members (12,14) being rotatable one relative to the other and defining the annular opening (36) between said second member (14) and the first and second surfaces (32,34) of said first member (12);

means (28) for supporting said first and second members (12,14) in rotation one relative to the other, *said means* (*28*) being a bearing (*38*) positioned between said first and second members (*12,14*) in said annular opening (*36*) ;

a seal body (38) connected to said second member (14) and positioned adjacent and extending about said annular opening (36);

a seal leg (40) having first, second and third sides (46,48,50) and first and second end portions (52,54) and being connected at the first end portion (52) to the body (38) and extending outwardly from said body (38) about *and across* the annular opening (36) and in a direction toward said first and second surfaces (32,34) of the first member (14) *to form a first channel* (*90*) adjacent the bearing (*30*) and a second channel (*92*) exposed to the environment, said first and second sides (46,48) being generally opposed, said third side (50) intersecting said first and second sides (46,48) at the second end portion (54), said second end portion (54) being of a configuration sufficient for being controllably deflectable in response to a force exerted on at least one of the first and third sides (46,50) of said leg (40); and first and second sealing areas (42,44) positioned on said leg (40) adjacent the intersection of the first and third sides [(46,48)] (*46,50*) and the second and third sides (48,50), respectively, and being in sealing, slidable contact with said first surface (32) and said second surface (34), respectively, of the first member (12) at a location sufficient for blocking access *of the foreign matter* through the annular opening (36) *from the second channel* (*92*) into the first channel (*90*) to the bearing (*30*) in response to forces exerted on the second side (48) of the leg (40), said first and second sealing areas (42,44) being both removable together from contact with said respective first and second surfaces (32,34) of the first member [(14)] (*12*) to relieve lubricant flow at the bearing (*30*) and in the first channel (*90*) through the annular opening (*36*) into the second channel (*92*) in response to controllably deflecting said second end portion (54).

19. The seal assembly (10), as set forth in claim 18, wherein said leg (40) has a middle portion (56) and said second side of the leg (40) is of a configuration sufficient for defining a reduced crosssectional area of said leg (40) at the middle portion (56) relative to the second end portion (54) of said leg (40).

20. The seal assembly (10), as set forth in claim 19, wherein said second side (48) has an arcuate surface (58) extending curvilinearly inwardly from the second end portion (54) toward the middle portion (56) in a direction generally toward the first side (46).

21. The seal assembly (10), as set forth in claim 18, wherein the first and second sealing areas (42,44) are located at the intersection of the first and third sides (46,50) and the second and third sides (48,50), respectively.

22. The seal assembly (10), as set forth in claim 18, wherein said seal assembly (10) has only a single leg (40).

23. The seal assembly (10), as set forth in claim 18, including a line (78) passing through said first and second sealing areas (42,44), said line (78) intersecting the first surface (32) of the first member (12) at an angle ($A_5$) in a range of about 45° to about 90°.

24. The seal assembly (10), as set forth in claim 23, wherein said angle ($A_5$) is about 45°.

25. The seal assembly (10), as set forth in claim 23, wherein said third side (50) defines the line (78) passing through said first and second sealing surfaces (42,44).

[26. The seal assembly (10), as set forth in claim 18, wherein said first side (46) intersects the first surface (32) of the first member (12) at an angle ($A_6$) of about 60°.]

27. The seal assembly (10), as set forth in claim 20, wherein said second side (48) has a substantially linear *and straight* portion (64) intersecting the third side (50) and an arcuate portion (62) defining the arcuate surface (58) of said second side (48).

28. The seal assembly (10), as set forth in claim 27, wherein said linear *and straight* portion (64) of the second side (48) intersects the second surface (34) of the first member (12) at an angle ($A_7$) of about 60°.

29. The seal assembly (10), as set forth in claim 18, wherein said first and second surfaces (32,34) of the first member (12) define first and second substantially perpendicular intersecting planes (32',34'), respectively, and including a line (78) passing between said first and second sealing areas (42,44), said line (78) defining a chord (80) of a circle (82) having a radial line (84), said radial line (84) substantially bisecting said chord (80) and passing immediately adjacent the intersection (86) of said planes (32',34').

30. The seal assembly (10), as set forth in claim 27, *wherein* said first side (46) of the leg (40) is substantially parallel to said linear *and straight* portion (64) of the second side (48).

31. The seal assembly (10), as set forth in claim 18, wherein said first and second sealing areas (42,44) urge against said first and second surfaces (32,34) of the first member (12), respectively.

32. The seal assembly (10), as set forth in claim 18, wherein said seal body (38), leg (40) and first and second sealing areas (42,44) are of unitary, elastomeric construction.

33. The seal assembly (10), as set forth in claim 18, wherein the third side (50) of the leg (40) extends between said first and second sealing areas (42,44) and said leg (40) forms an annular chamber (88) with said first member (12), said annular chamber (88) being defined by the first and second surfaces (32,34) of said first member (12) and the third side (50) of the leg (40).

[34. The seal assembly (10), as set forth in claim 33, wherein the leg (40) forms first and second channels (90,92) with said first member (12), said first and second channels (90,92) being defined by the first side (46) of the leg (40) and first surface (32) of the first member (12) and the second side (48) of the leg (40) and the second surface (34) of the first member (12), respectively, and being of a construction sufficient for being positionable in communication one with the other in response to removing the first and second sealing areas (42,44) from contact with the first and second surfaces (32,34), respectively.]

35. The seal assembly (10), as set forth in claim 18, including means (63) for biasing the second end portion (54) of the leg (40) relative to the first end portion (52) of the leg (40) in a direction ($D_2$) toward the first surface (32) of the first member (12).

36. The seal assembly (10), as set forth in claim 35, wherein said biasing means (63) is a spring (65) positioned on the second side (48) of the leg (40).

* * * * *